June 4, 1929.  E. RISLEY  1,716,284

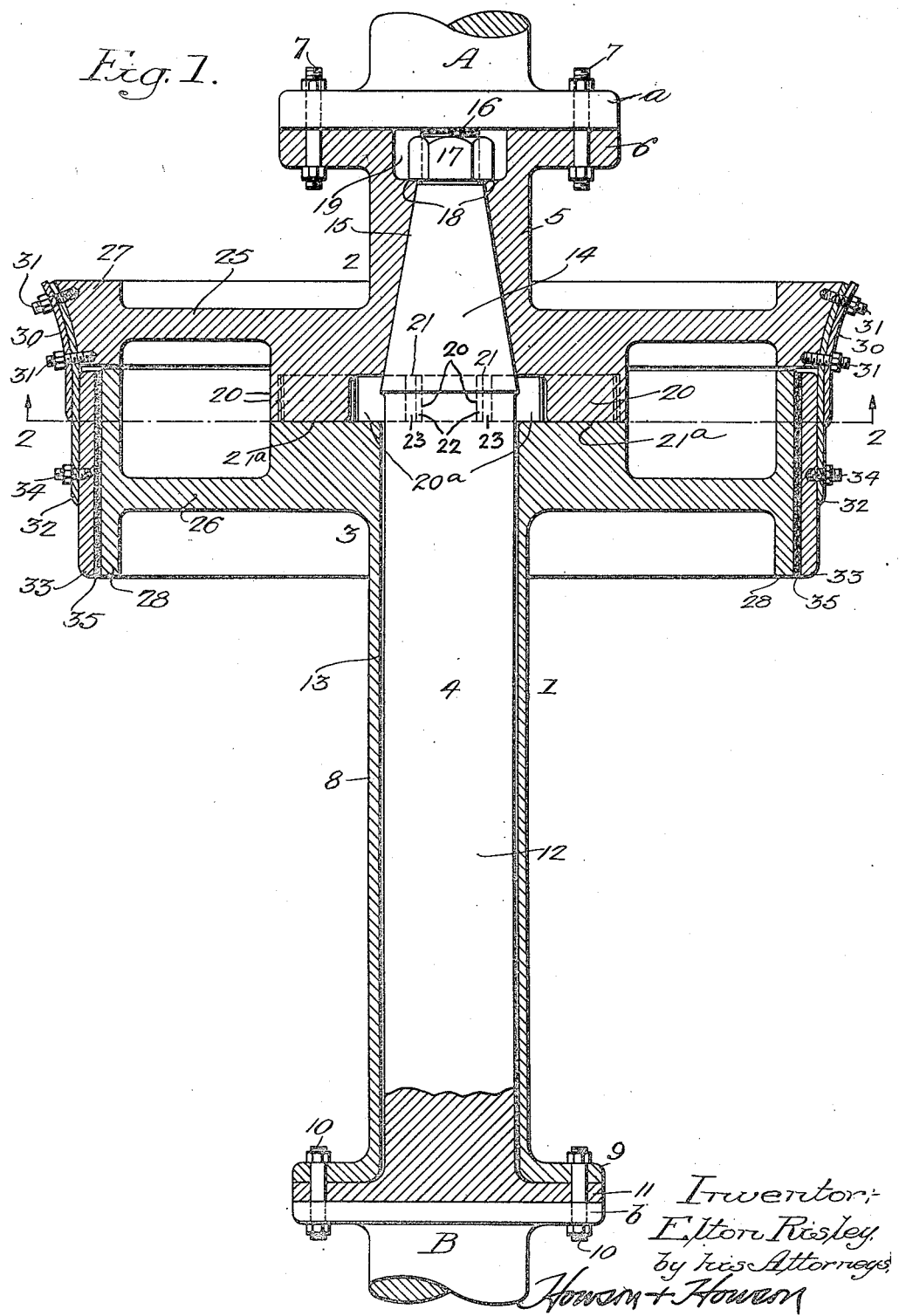

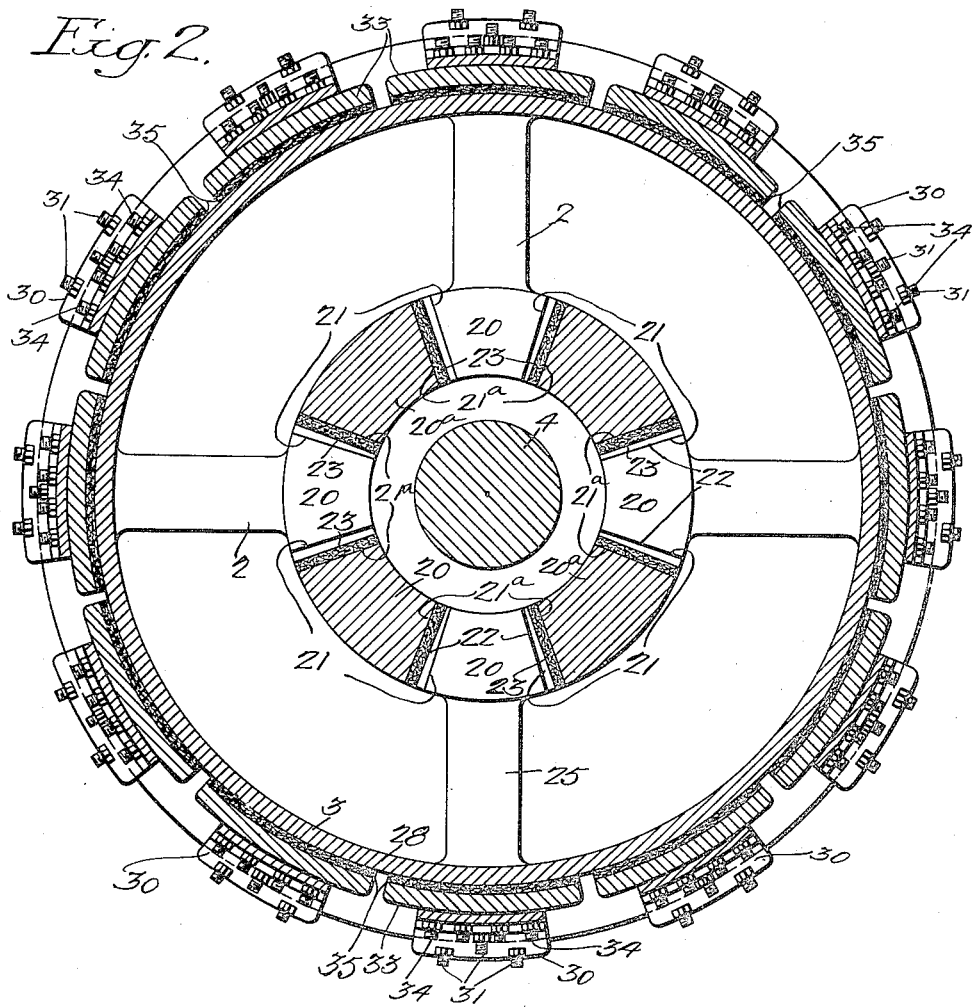
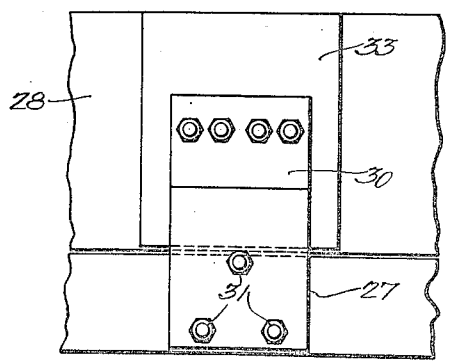

TORSIONAL VIBRATION DAMPENER

Filed Aug. 18, 1927   3 Sheets-Sheet 3

Inventor;
Elton Risley,
by his Attorneys.
Howson & Howson

Patented June 4, 1929.

1,716,284

UNITED STATES PATENT OFFICE.

ELTON RISLEY, OF VENTNOR CITY, NEW JERSEY.

TORSIONAL VIBRATION DAMPENER.

Application filed August 18, 1927. Serial No. 213,892.

This invention relates to torsional vibration dampeners for motive power engines employing the "Diesel" principles, and in which the power shaft is subjected to uneven strains caused by the high compression and high pressures developed in the cylinders of engines employing this principle of actuation.

In Diesel and similar type engines, considerable difficulty has been experienced with torsional vibrations which tend to break the crank shafts and the power shafts employed to directly connect the main shafts of generators, pumps, etc., with the crank shafts of the engines.

As each crank moves on a compression stroke the forward progress of the crank shaft is retarded, and as the crank moves over the dead center at the end of the compression stroke the tendency of the crank is to spring forward and thus accelerate the forward progress of the crank shaft. The device being driven by such an engine has a tendency to balance this erratic action of the crank shaft, and move in a rather uniform manner. Thus, the engine crank shaft, the shaft of the device being driven, or a shaft connecting the two, if such exists, is subjected to the alternating retardation and progression strains which, coming in rapid succession, are transformed into high frequency alternating metal fatiguing vibrations.

The frequency of these vibrations, if ocurring concurrently with the natural dynamic frequency of the crank shaft, endangers the safety of the shaft in operation. As the natural frequency of the shaft varies at different velocities of the shaft, this concurrency may occur at a number of different speeds of the shaft, with disastrous effects.

The principal object of my invention is to dampen these pressure vibrations by converting their energy into heat, and subsequently dissipating the heat so produced.

Another object of my invention is to construct a dampening device which may be connected between the crank shaft of the engine and the device being driven thereby, without necessitating any changes to either of these devices.

The details of the construction of my invention will be fully disclosed hereinafter, reference being had to the accompanying drawings, of which:

Fig. 1 is a sectional plan view of my dampener interconnected between a motive power shaft and a driven shaft.

Fig. 2 is a transverse sectional elevation taken on the line 2—2 of Fig. 1;

Fig. 3 is a plan view of a detail of the invention, and

Figure 4:
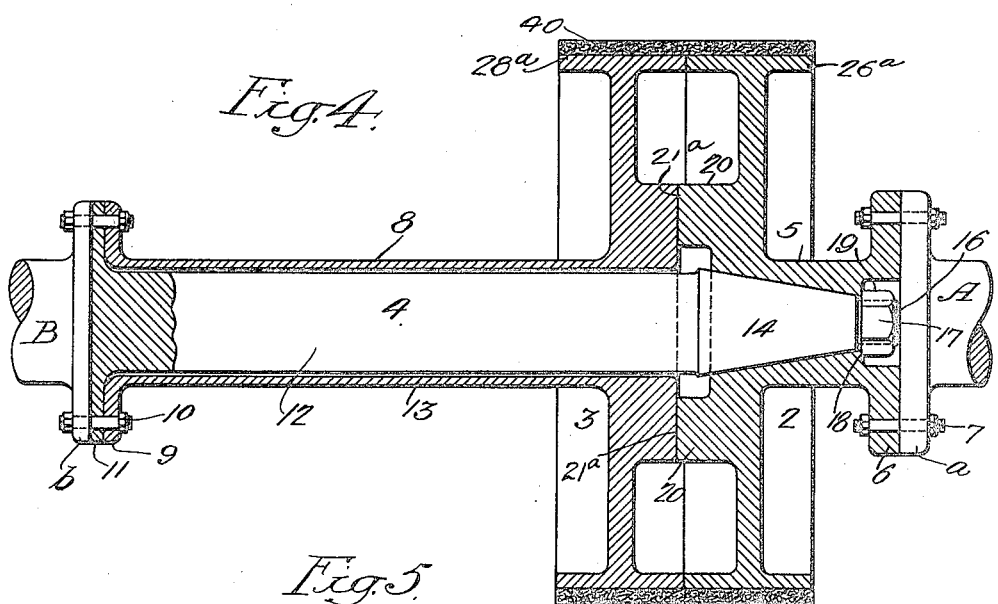
Figs. 4 and 5 are respectively a longitudinal and a transverse sectional elevation of a modified form of the invention.

Referring to Figs. 1, 2 and 3, one end of a crank shaft of a Diesel engine is illustrated at A, and one end of a driven generator shaft is illustrated at B. Interposed between and operatively connecting these two shaft ends, I have illustrated my improved vibration dampener 1.

My vibration dampener comprises a pair of independent wheel members 2 and 3 concentrically disposed relative to a shaft member 4, which coaxially aligns with the two shafts A and B.

The wheel member 2 is provided with an integral hub 5 having a flange 6 which is secured to a flange $a$ on the shaft A, by means of bolts 7, 7.

The wheel member 3 is provided with an elongated integral hub 8, on the end of which is formed a flange 9. The flange 9 is operatively connected to a flange $b$ on the shaft B, by means of bolts 10, 10.

The shaft member 4 is provided with a flange 11 at one of its ends, which is disposed between the said flanges 9 and $b$, the securing bolts 10 passing through apertures formed in the three adjacent flanges. The body portion 12 of the shaft element 4 extends longitudinally through a central bore 13 formed in the elongated hub 8 of the wheel member 3. The second end of the shaft element 4 is tapered, as shown at 14, and fits within a tapered bore 15 formed in the hub 5 of the wheel member 2. The extreme end of the shaft element 4, beyond the tapered portion 14 thereof, is reduced and threaded, as shown at 16, for the reception of a securing nut 17 which abuts against a shoulder 18 formed in a counterbore 19. The counterbore 19 is formed in the end of the hub 2, and accommodates the securing nut 17.

The connection formed between the tapered portion 14 of the shaft element 4 and the hub 2 is a rigid one. The body 12 of the said shaft element 4 is composed of metal capable of a great amount of torsional flexibility. Thus the shafts A and B are directly coupled by means of the flexible shaft element 4.

The adjacent faces of the hubs 5 and 8 of the respective wheel members 2 and 3 are provided with alternating projections 20 and recesses 21, formed therebetween, as clearly shown in Figs. 1 and 2. The projections 20 of the member 2 fit within the recesses 21ª of the member 3 and the projections 20ª of the member 3 fit within the recesses 21 of the member 2, a space 22 being formed between the adjacent longitudinally extending sides of the cooperating projections, which permits a limited amount of angular movement between the two wheel members 2 and 3 around the center of the shaft element 4. The longitudinal walls of one set of projections are padded, as illustrated at 23, to prevent noises occurring if the two sets of projections contact with each other, which, however, only happens in event of extreme relative circular movement between the two wheel members 2 and 3.

The hub sections 5 and 8 of the wheel members 2 and 3 are respectively provided with spokes or webs 25 and 26, which integrally support annular face portions or rims 27 and 28 of the wheel members 2 and 3 respectively.

The rim 27 of the wheel member 2 is flared outwardly away from the rim 28 of the wheel member 3. Spring elements 30, 30 are each secured at one of their ends to the rim 27 by means of bolts 31, 31, and the opposite end 32 overhangs the rim 28 of the wheel member 3. A shoe 33 is secured by means of bolts 34, 34 to each of the overhanging spring ends 32, and friction material 35 is secured to each shoe 33 intermediate said shoe and the periphery of the rim 28.

In operation the shaft A, in the present instance considered as the crank shaft of a Diesel engine, operates in the usual manner to drive or rotate the shaft B, which in this instance may be considered as the shaft of an electric generator.

During the compression stroke of each of the cranks (not shown) of the shaft A, a backward springing or momentary retardation of the forward progress of the rotation of the shaft is produced, and when the said cranks arrive at and move past the dead center of such compression stroke the momentary retardation is transformed into a forward acceleration of the rotation of the shaft. These alternating jerky or springy idiosyncracies of the shaft A ordinarily are transmitted to the shaft B which, however, is maintained at a more or less constant uniform speed, due to the balancing effect of the generator armature or other revolving element. Thus the connecting shaft, intermediate the last crank on the crank shaft A and the adjacent end of the revolving element on the shaft B, is subjected to a series of alternating backward and forward torsional strains or vibrations which has a tendency to fatigue the metal, and thus break the shaft.

According to the principles of my invention, these alternating vibrations are transmitted to the shaft section 4 which is composed of extremely flexible metal. The wheel member 2 is rigidly attached to one end of this shaft element 4 and to the crank shaft A, and therefore is subjected to a similar series of alternating vibrations.

The wheel element 3 is rigidly secured to the uniformly balanced rotating shaft B, and is therefore not subjected to the vibrations above noted, thus a relative circular movement is produced between the wheel members 2 and 3. The shoes 33 being attached to the wheel member 2 have a tendency to move backward and forward over the face of the rim 28 of the wheel member 3, when the alternating vibrations occur, but are partially or wholly prevented from so doing by the friction produced between the material 35 on the shoes 33 and the face of the rim 28, thus the above mentioned vibrations are dampened, and their energy transformed into heat, through the friction developed, which is dissipated by centrifugal action of the revolving wheel members 2 and 3.

The cooperating projections 20, 20ª only act in event of extraordinary torque being applied to the shafts A or B, and at such times limit the amount of possible torsional flexing of the shaft member 4 by making a direct coupling between the shafts A and B through the hubs 5 and 8 of the wheel members 2 and 3 respectively.

Figure 5:
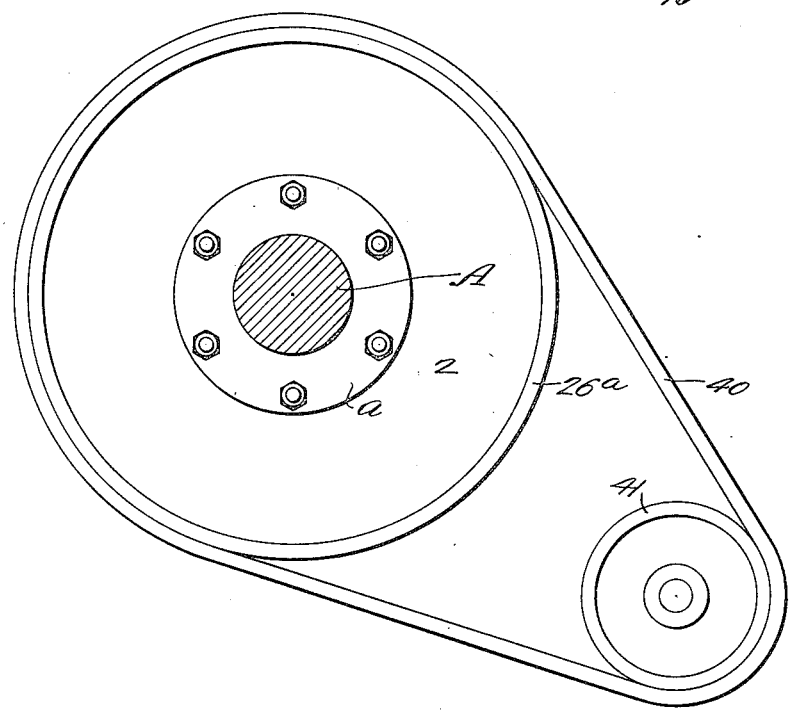

In Figs. 4 and 5, the springs 30 and the friction shoes 33—35 are replaced by a broad friction belt 40 simultaneously passing around both of the adjacently disposed peripheries 26ª and 28ª of the wheel members 2 and 3, which in this instance are plain faced pulleys of equal diameters. The belt 40 also passes around an idler pulley 41 to maintain the belt 40 under a definite uniform tension. The operation of this device is similar to that of the preferred form of the invention, above described.

I claim:

1. A torsional vibration dampener adapted to be inserted between a rotatable driving shaft and a driven shaft and comprising a flexible shaft element operatively connected at its opposite ends to said driving and driven shafts respectively; a non-flexible independent member rigidly connected to said driving shaft; a non-flexible independent member rigidly connected to said driven shaft; and means for frictionally connecting said independent members.

2. A torsional vibration dampener adapted to be inserted between a rotatable driving shaft and a driven shaft and comprising a flexible shaft element operatively connected at its opposite ends to said driving and driven shafts respectively; a wheel member rigidly connected to said driving shaft; a wheel member rigidly connected to said driven shaft; and means for frictionally connecting said wheel members.

3. A torsional vibration dampener adapted to be inserted between a rotatable driving shaft and a driven shaft and comprising a flexible shaft element operatively connected at its opposite ends to said driving and driven shafts respectively; a wheel member rigidly connected to said driving shaft; a wheel member rigidly connected to said driven shaft; means for frictionally connecting said wheel members; and means for limiting the amount of relative circular movement between said wheel members.

4. A torsional vibration dampener adapted to be inserted between a rotatable driving shaft and a driven shaft and comprising a flexible shaft element operatively connected at its opposite ends to said driving and driven shafts respectively; a wheel member rigidly connected to said driving shaft; a wheel member rigidly connected to said driven shaft; means for frictionally connecting said wheel members, comprising shoes carried by one of said wheel members and adapted to engage the other of said wheel members; and means for applying pressure to said shoes.

5. A torsional vibration dampener adapted to be inserted between a rotatable driving shaft and a driven shaft and comprising a flexible shaft element operatively connected at its opposite ends to said driving and driven shafts respectively; a wheel member rigidly connected to said driving shaft; a wheel member rigidly connected to said driven shaft; and means for frictionally connecting said wheel members, comprising spring-pressed shoes on one of said wheel members and adapted to engage the other of said wheel members.

6. A torsional vibration dampener adapted to be inserted between a rotatable driving shaft and a driven shaft and comprising a flexible shaft element operatively connected at its opposite ends to said driving and driven shafts respectively; a wheel member rigidly connected to said driving shaft; a wheel member rigidly connected to said driven shaft; means for frictionally connecting said wheel members; and means for limiting the amount of relative circular movement between said wheel members, comprising a series of spaced projections on each of said wheel members, the projections of one wheel member extending into the recessed formed between the projections of the other wheel member.

7. A torsional vibration dampener adapted to be inserted between a rotatable driving shaft and a driven shaft and comprising a flexible shaft element operatively connected at its opposite ends to said driving and driven shafts respectively; a wheel member rigidly connected to said shaft; a wheel member rigidly connected to said driven shaft; means for frictionally connecting said wheel members; means for limiting the amount of relative circular movement between said wheel members, comprising a series of spaced projections on each of said wheel members, the projections of one wheel member extending into the recesses formed between the projections of the other wheel member; and a buffing element in each of said recesses between the cooperative faces of said projections.

8. A torsional vibration dampener adapted to be inserted between a rotatable driving shaft and a driven shaft and comprising a positive driving element which is capable of a limited amount of flexibility within prescribed limits and which is operatively connected to said driving and driven shafts; and means for frictionally connecting said shaft members.

9. A torsional vibration dampener located between a rotatable driving shaft and a driven shaft and comprising a resilient, positive driving coupling operatively connecting said driving and driven shafts; and means for frictionally connecting said shafts.

ELTON RISLEY.